US012357001B2

(12) United States Patent
Cao et al.

(10) Patent No.: US 12,357,001 B2
(45) Date of Patent: Jul. 15, 2025

(54) VACUUM CHAMBER APPARATUS WITH SINGLE ROLLER FOR ROTATING CONTAINER

(71) Applicant: EnWave Corporation, Delta (CA)

(72) Inventors: Li Bing Cao, Delta (CA); Jun Fu, Delta (CA); Noel Barker, Delta (CA)

(73) Assignee: EnWave Corporation, Delta (CA)

( * ) Notice: Subject to any disclaimer, the term of this patent is extended or adjusted under 35 U.S.C. 154(b) by 625 days.

(21) Appl. No.: 17/758,446

(22) PCT Filed: Feb. 28, 2020

(86) PCT No.: PCT/CA2020/050266
§ 371 (c)(1),
(2) Date: Jul. 6, 2022

(87) PCT Pub. No.: WO2021/168532
PCT Pub. Date: Sep. 2, 2021

(65) Prior Publication Data
US 2023/0000116 A1 Jan. 5, 2023

(51) Int. Cl.
*A23B 2/94* (2025.01)
*A23B 2/97* (2025.01)
(Continued)

(52) U.S. Cl.
CPC ............... *A23B 2/945* (2025.01); *A23B 2/97* (2025.01); *F26B 3/347* (2013.01); *F26B 5/042* (2013.01);
(Continued)

(58) Field of Classification Search
CPC .......... A23B 2/97; F26B 3/347; F26B 11/022; F26B 25/02
See application file for complete search history.

(56) References Cited

U.S. PATENT DOCUMENTS 2,311,824 A 2/1943 Gautreau
2,848,210 A 8/1958 Compton
(Continued)

FOREIGN PATENT DOCUMENTS

CA 2354300 A1 1/2003
CA 2557628 A1 2/2008
(Continued)

OTHER PUBLICATIONS

Office Action in JP2022550951, mailed Feb. 6, 2024, 5 pages.
(Continued)

*Primary Examiner* — David J Laux
(74) *Attorney, Agent, or Firm* — McKee, Voorhees & Sease, PLC

(57) ABSTRACT

An apparatus and method for providing a simpler and more robust mechanism for transporting materials to be dried through a vacuum microwave chamber in rotating containers. The apparatus (20) has a vacuum chamber (22), an input end (26) to introduce a container (24) into the chamber, and a discharge end (28) to remove the container. The container has spur gear teeth (60) extending along its outer circumferential surface. The apparatus has a single roller (42) having spur gear teeth (46) extending along its outer circumferential surface. The spur gear teeth of the roller mesh with the spur gear teeth of the container such that rotation of the roller about its longitudinal axis rotates the container. The apparatus also includes means for holding the container on the roller, means for moving the container through the chamber, a microwave generator 76 arranged for transmission of microwave radiation from the generator into the chamber, and means for reducing pressure inside the chamber.

15 Claims, 4 Drawing Sheets

(51) Int. Cl.
*F26B 3/347* (2006.01)
*F26B 5/04* (2006.01)
*F26B 11/02* (2006.01)
*F26B 11/04* (2006.01)
*F26B 25/00* (2006.01)
*F26B 25/02* (2006.01)

(52) U.S. Cl.
CPC .......... *F26B 11/022* (2013.01); *F26B 11/049* (2013.01); *F26B 11/0495* (2013.01); *F26B 25/001* (2013.01); *F26B 25/02* (2013.01)

(56) References Cited

U.S. PATENT DOCUMENTS

| | | | |
|---|---|---|---|
| 2,939,383 A * | 6/1960 | Kanaga | A47J 37/047 99/341 |
| 4,045,639 A | 8/1977 | Meisel | |
| 4,330,946 A | 5/1982 | Courneya | |
| 4,389,794 A | 6/1983 | Bitterly | |
| 4,664,924 A | 5/1987 | Sugisawa et al. | |
| 4,809,596 A | 3/1989 | Akutsu et al. | |
| 4,882,851 A | 11/1989 | Wennerstrum et al. | |
| 5,230,167 A * | 7/1993 | Lahoda | B09C 1/06 34/79 |
| 5,672,370 A | 9/1997 | Durance et al. | |
| 6,128,321 A | 10/2000 | Bennett et al. | |
| 6,128,831 A | 10/2000 | Durance et al. | |
| 6,956,865 B1 | 10/2005 | Khaunte et al. | |
| 7,067,327 B2 | 6/2006 | Wu et al. | |
| 9,267,734 B2 | 2/2016 | Durance et al. | |
| 2006/0286234 A1 | 12/2006 | Tsai et al. | |
| 2008/0181994 A1 | 7/2008 | Cornwell et al. | |
| 2010/0218395 A1 * | 9/2010 | Durance | F26B 15/143 34/406 |
| 2012/0291305 A1 * | 11/2012 | Fu | A23B 2/97 34/263 |
| 2014/0328867 A1 * | 11/2014 | Fu | C12N 9/00 34/259 |
| 2015/0128442 A1 * | 5/2015 | Durance | F26B 3/347 34/259 |
| 2017/0115057 A1 * | 4/2017 | Durance | F26B 5/04 |
| 2019/0257581 A1 * | 8/2019 | Wray | F26B 1/005 |
| 2020/0200475 A1 * | 6/2020 | Durance | F26B 5/06 |

FOREIGN PATENT DOCUMENTS

| | | |
|---|---|---|
| JP | H04207168 A | 7/1992 |
| JP | 2014081093 A | 5/2014 |
| KR | 100804835 B1 | 2/2008 |
| WO | 2009/049409 | 4/2009 |
| WO | 2014/085897 | 6/2014 |

OTHER PUBLICATIONS

International Search Report in PCT/CA2008/001811, mailed Feb. 16, 2009, 5 pages.

Nutrarev Basket-Based Drying System, EnWave Corporation, 1 page, published Jul. 2015.

Extended European Search Report in EP20921518.5, mailed Oct. 13, 2023, 9 pages.

González-Cavieres et al., "Advances in vacuum microwave drying (VMD) systems for food products," Trends in Food Science and Technology, 2021, vol. 116, pp. 626-638.

* cited by examiner

US 12,357,001 B2

VACUUM CHAMBER APPARATUS WITH SINGLE ROLLER FOR ROTATING CONTAINER

CROSS REFERENCE TO RELATED APPLICATIONS

This application is a U.S. national phase of PCT/CA2020/050266 filed Feb. 28, 2020 which is herein incorporated by reference in its entirety, including without limitation, the specification, claims, and abstract, as well as any figures, tables, appendices, or drawings thereof.

FIELD OF THE INVENTION

The invention pertains to apparatuses and methods for dehydrating organic materials such as food products in a vacuum chamber of the type in which the organic materials are transported through the vacuum chamber in a rotating container.

BACKGROUND

Dehydration of organic materials such as foods and plant materials by vacuum microwave dehydration is known in the art. In one type of these dehydration apparatuses, disclosed, for example, in WO 2009/049409 published Apr. 23, 2009 and WO 2014/085897 published Jun. 12, 2014, organic materials are dehydrated by transporting the materials through a vacuum microwave chamber in a rotating container. In the apparatus disclosed in WO 2014/085897, a pair of rotatable rollers is arranged to support and rotate the container of materials about its horizontal axis and a chain drive is provided to transport the container along the rollers through the length of the chamber. This type of prior art machine is mechanically complicated: the double rollers must maintain synchronization, the transmission mechanism for operating the rollers is highly complex, and the relative alignment of the rollers (e.g., the distance and angle between them) must precisely correspond with the diameter of the rotatable containers to permit proper engagement of the rollers with the containers. The required level of precision for proper operation of this type of machine can be difficult to achieve in a microwave dehydration process since the containers will expand and eventually become distorted over time with the high operating temperatures.

There is a need in the dehydration industry for a vacuum microwave dehydration apparatus with a simpler and more robust mechanism for transporting rotatable containers. The present invention is directed to an improved vacuum microwave drying apparatus.

SUMMARY

The invention provides an apparatus for dehydrating organic material. A vacuum chamber has an input end for the introduction of a container of the material to be dehydrated and a discharge end for removal of the container of dehydrated material. The container has spur gear teeth extending along part or all of its outer circumferential surface, and is supported on a single roller, extending longitudinally along a length of the vacuum chamber, with spur gear teeth extending along part or all of its outer circumferential surface. The spur gear teeth of the roller mesh with the spur gear teeth of the container such that driving the rotation of the roller about its longitudinal axis rotates the container about its longitudinal axis. The apparatus includes means for reducing the pressure in the vacuum chamber, means for rotating the roller about its longitudinal axis, means for holding the rotating container on the roller, and means for moving the rotating container through the vacuum chamber along the roller from an input zone to a discharge zone. The apparatus also includes a microwave generator arranged for transmission of microwave radiation from the generator into the vacuum chamber.

Another aspect of the invention provides a method for dehydrating an organic material. An organic material to be dehydrated is loaded into a container. The container is introduced into a vacuum chamber, the chamber being at a pressure less than atmospheric. The container is supported on a single roller within the vacuum chamber, with the spur gear teeth on the roller meshing with the spur gear teeth on the container. The container is rotated inside the vacuum chamber by the rotation of the roller through the engagement of the pairs of spur gear teeth. The rotating container is moved through the vacuum chamber while applying microwave radiation to dehydrate the organic materials. The container of dehydrated organic material is then removed from the vacuum chamber.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
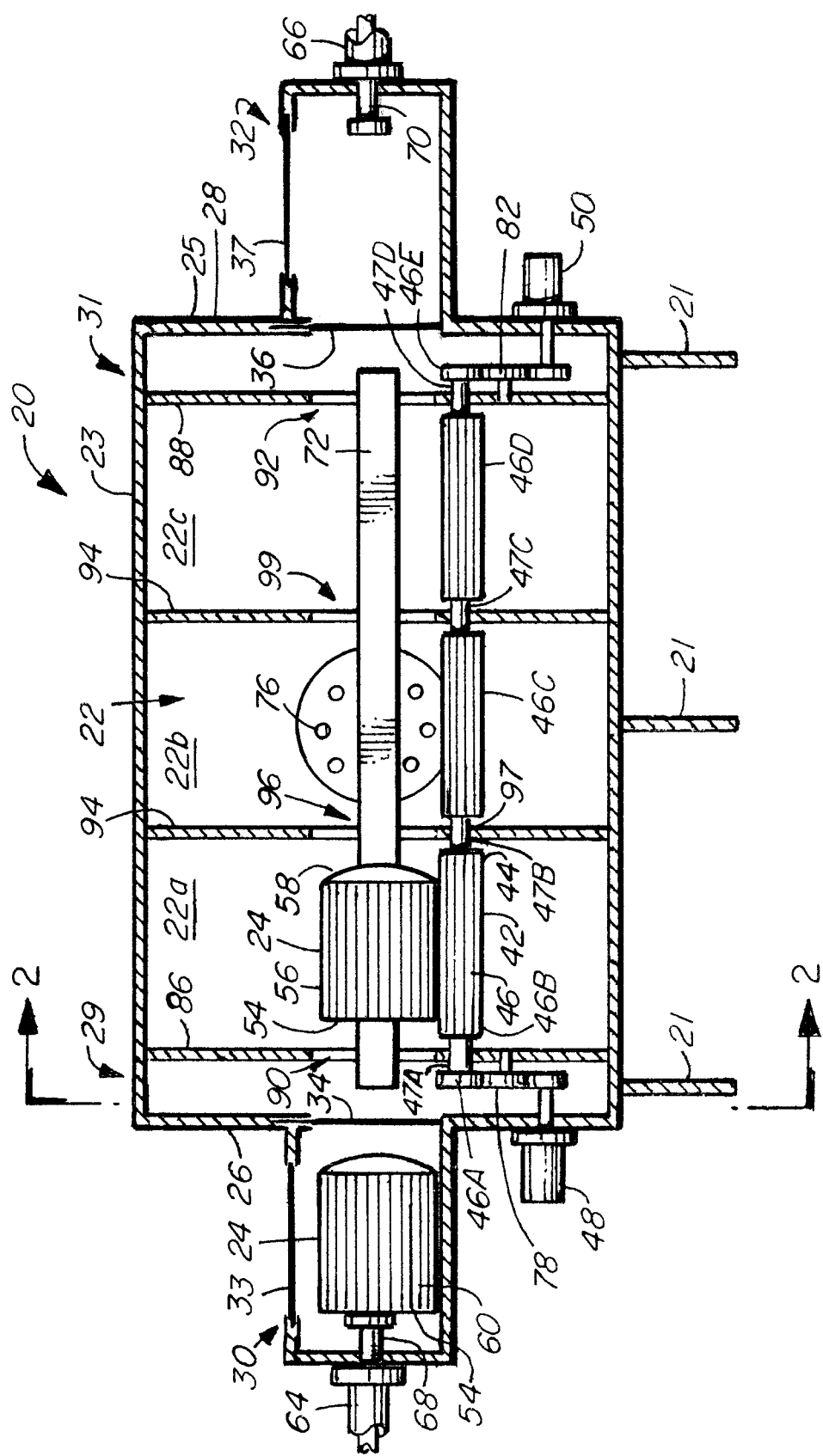
FIG. 1 is a cutaway side elevational view of the vacuum microwave drying apparatus according to one embodiment of the invention.
Figure 2:
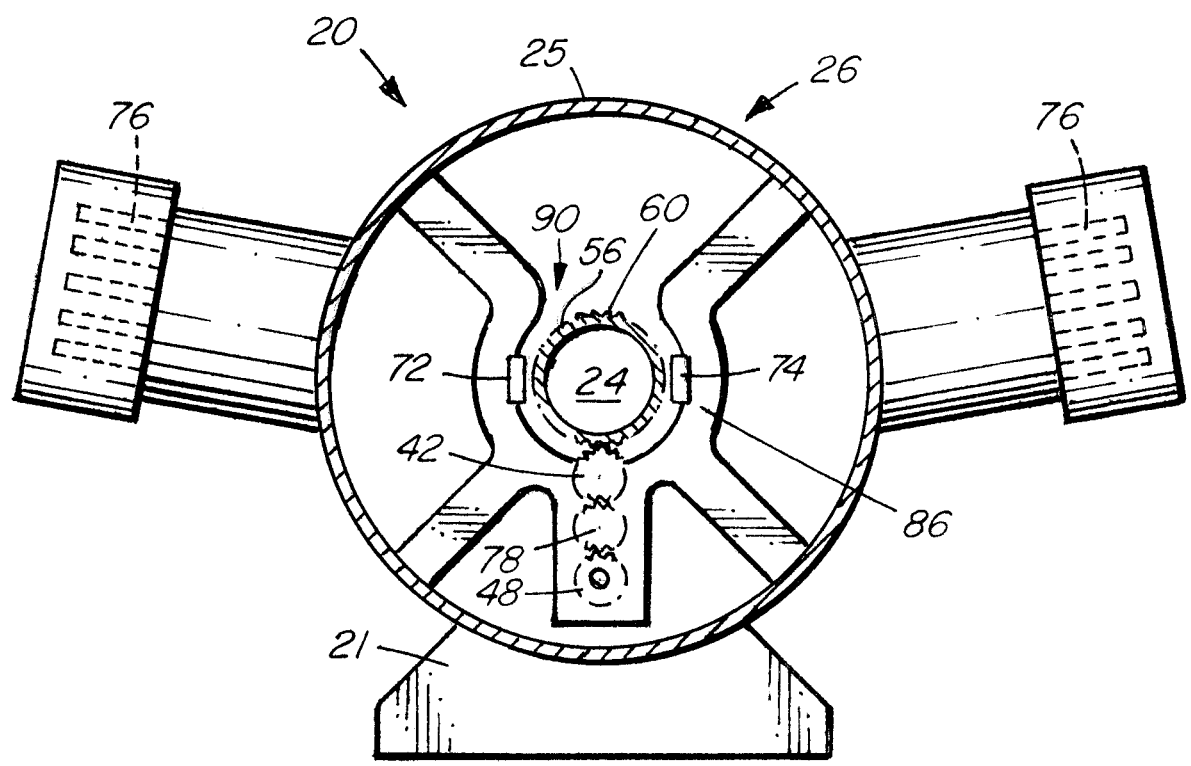
FIG. 2 is a sectional view on the line 2-2 of FIG. 1, showing the input end of the vacuum chamber of the apparatus of FIG. 1, the discharge end being substantially identical thereto.
Figure 3:
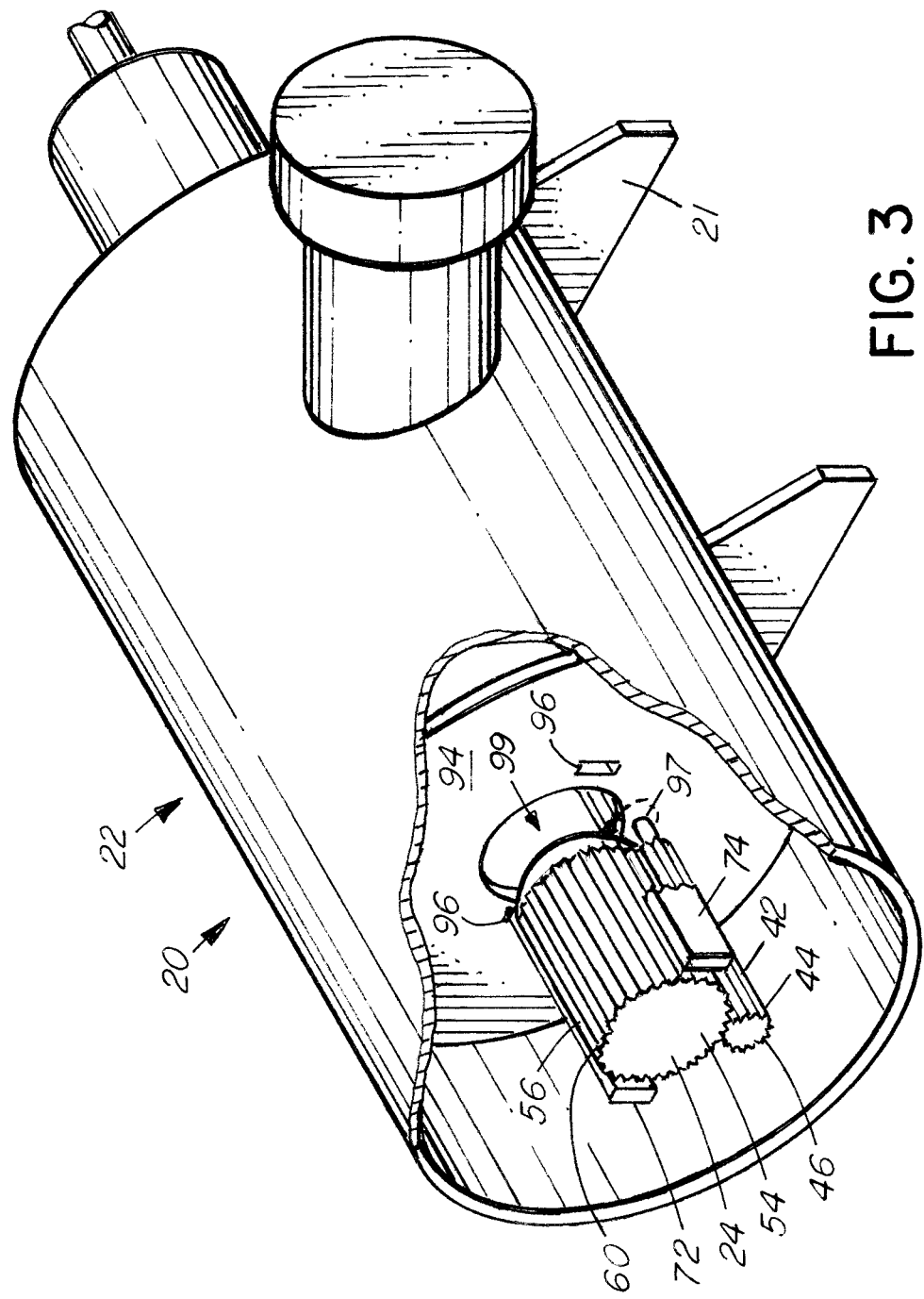
FIG. 3 is an isometric sectional view, partly cutaway, of the vacuum chamber of the apparatus of FIG. 1.

Referring to FIGS. 1 to 3, in one embodiment the apparatus of the invention is a vacuum microwave dehydration apparatus 20. The apparatus 20 has a vacuum chamber 22, through which a container 24 of organic materials is transported for vacuum microwave dehydration, and a microwave generator 76. The vacuum chamber 22 has a cylindrical wall 25 supported by a stand 21, an input end 26 for introducing the container 24 into the vacuum chamber 22, and a discharge end 28 for removing the container 24 from the vacuum chamber 22. A loading module 30 is provided at the input end 26 for loading the container 24 containing organic materials to be dehydrated into the vacuum chamber 22. A discharge module 32 is provided at the discharge end 28 for holding the container 24 containing the dehydrated organic materials after being removed from the vacuum chamber 22. The loading module 30 and the discharge module 32 each have a pair of airlock doors, respectively 33, 34 and 36, 37. These permit the containers 24 to be loaded into and unloaded from the vacuum chamber 22, while maintaining the chamber 22 at the reduced pressure required for the dehydration process. The airlock doors are self-sealing doors that form an airtight seal in their closed positions. Airlock doors 34, 36 separate the respective loading module 30 and discharge module 32 from the vacuum chamber 22.

Means are provided within the vacuum chamber 22 for rotating the container 24 and for moving it from the input end 26 to the discharge end 28. A roller 42 is a longitudinal rod extending along a length of the vacuum chamber 22 with one end mounted at an input zone 29 of the vacuum chamber 22 and the other end mounted at a discharge zone 31 for rotation about its longitudinal, horizontal axis, an axis parallel to the longitudinal axis of the vacuum chamber 22, within the vacuum chamber 22. Mounting plates (not shown) may be provided at the input 29 and discharge 31 zones for supporting the respective ends of the roller 42. The input zone 29 is a portion of the vacuum chamber 22 proximate to the input end 26; the discharge zone 31 is a portion of the vacuum chamber 22 proximate to the discharge end 28. The roller 42 has a circumferential surface 44 having spur gear teeth 46 extending along its length, parallel to the longitudinal axis of the roller 42. The spur gear teeth 46 may extend along the entire length of the roller 42, or extend intermittently along the length thereof such that the roller 42 has alternating sections of spur gear teeth containing circumferential surfaces 46A-46E and sections with smooth circumferential surfaces 47A-47D. A gear 78 is mounted on the input zone mounting plate, below the roller 42, to engage the spur gear teeth 46 of the roller 42 at one end, and a gear 82 is mounted on the discharge zone mounting plate, below the roller 42, to engage the spur gear teeth 46 of the roller 42 at the other end. Gears 78, 82 are driven by a respective drive motor 48, 50, synchronized together, to rotate the roller 42 about its longitudinal axis, within the vacuum chamber 22. The mounting plates may be secured to a respective end support frame 86, 88, which is mounted on the inner side of the cylindrical wall 25 at the respective input 29 and discharge zones 31 of the vacuum chamber 22.

The container 24 is a basket made of a microwave-transparent material, such as high density polyethylene, with a closed bottom wall 54, a cylindrical surface 56 and a removable lid 58. The cylindrical surface 56 has spur gear teeth 60 extending along part or all of its outer circumferential surface, parallel to the longitudinal axis of the container 24. The spur gear teeth 46 of the roller 42 are aligned to mesh with the spur gear teeth 60 of the container 24 to rotate the container 24 about its longitudinal axis as the roller 42 is driven to rotation about its longitudinal axis. The end support frames 86, 88 define an opening 90, 92 through which the container 24 is introduced into and removed from the vacuum chamber 22, aligning the spur gear teeth 46 of the roller 42 with the spur gear teeth 60 of the container 24 within the vacuum chamber 22.

Means are provided within the vacuum chamber 22 for holding the container 24 on the rotating roller 42. As best seen in FIG. 2, a pair of guide members 72, 74 is secured to opposite sides of the opening 90 defined by the end support frame 86, circumferentially spaced from the roller 42, at the input zone 29, and to opposite sides of the opening 92 defined by the end support frame 88, circumferentially spaced from the roller 42, at the discharge zone 31. Guide members 72, 74 extend longitudinally through a length of the vacuum chamber 22 from the input zone 29 to the discharge zone 31, parallel to the longitudinal axis of the vacuum chamber 22. The guide members 72, 74 are flat rectangular plates, arranged adjacent to opposing sides of the cylindrical surface 56 of the container 24, for guiding the container 24 as it moves along the rotating roller 42. Multiple pairs of longitudinally-spaced or adjoining guide members (not shown) may be provided to extend the length of the vacuum chamber 22. This is useful where, for example, the vacuum chamber is of a substantial length.

A plurality of chamber dividers 94, each extending across the internal, lateral cross-sectional area of the vacuum chamber 22, separate the vacuum chamber 22 into a plurality of vacuum chamber modules (shown as modules 22a, 22b, 22c in FIG. 1). For convenience of illustration, the vacuum chamber 22 is shown with only three modules, but it will be understood that it can have any practical number of modules, as may be required for a particular application. Each of the chamber dividers 94 has openings 96, 97, through which the guide members 72, 74 and the roller 42 extend respectively, for supporting the guide members and rollers through the intermediate portions of the vacuum chamber 22 between the end support frames 86, 88 at the input 29 and discharge 31 zones. Each of the chamber dividers 94 also has an opening 99 for providing a passageway between adjacent vacuum chamber modules for movement of the containers 24 from one module to an adjacent module. The chamber dividers 94 act as microwave chokes to minimize cross interference between chamber modules.

Means are provided for moving the container 24 through the vacuum chamber 22 at the input module 30 and for removing the container 24 from the vacuum chamber 22 at the discharge module 32. FIG. 1 illustrates an example mechanism. A pushing cylinder 64 is affixed to the input module 30 for pushing the container 24 through the input end 26 of the vacuum chamber 22, and a pulling cylinder 66 is affixed to the discharge module 32 for pulling the container 24 out of the vacuum chamber 22 at the discharge end 28. The pushing cylinder 64 and the pulling cylinder 66 are air cylinders, with a piston 68, 70 respectively, that is moveable between a position extending into the vacuum chamber 22 through the respective loading 30 and discharge modules 32 and a retracted position. Connection means may be provided at the bottom wall 54 and the lid 58 of the container 24 to secure the container 24 to the respective piston 68, 70.

A plurality of containers 24, each loaded with organic materials, can be concurrently supported on the roller 42. As best seen in FIG. 1, containers 24 are sequentially introduced into the vacuum chamber 22 and arranged to be moved, one after another, along the length of the roller 42. The containers abut one another on the roller 42, such that each downstream container is pushed by the adjacent upstream container.

Figure 4:
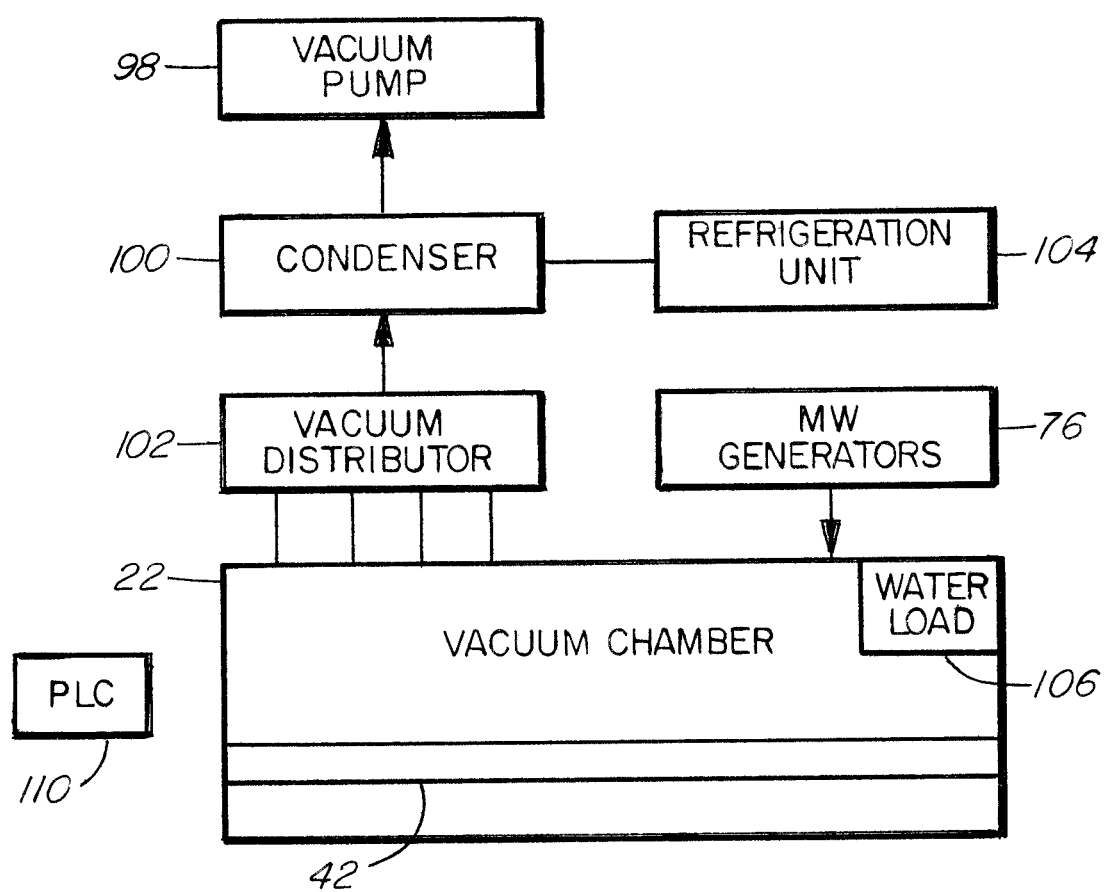
FIG. 4 is a schematic view of the apparatus of FIG. 1.

The dehydrating apparatus 20 includes the components conventionally required for the operation of vacuum microwave driers. As illustrated schematically in FIG. 4, a vacuum pump 98 is operatively connected through a condenser 100 and via a vacuum distributor 102 to vacuum ports in the vacuum chamber 22. The condenser condenses water vapor produced during dehydration of the organic material. A refrigeration unit 104, comprising a compressor, cooling fan and refrigerant pump, conveys refrigerant to the condenser 100 to maintain the condenser at a desired temperature. A water load system 106 may be provided in the vacuum chamber 22 to absorb excess microwave energy, by means of a water pump and conventional piping within the vacuum chamber. The dehydration apparatus 20 includes a programmable logic controller (PLC) 110, programmed and connected to control the operation of the system, including controlling the drive motors 48, 50 to rotate the roller 42, the microwave generators 76, the vacuum pump 98, the refrigerant pump, the airlock doors 33, 34, 36, 37, and the pushing and pulling cylinders 64, 66.

The dehydrating apparatus 20 operates according to the following method. The vacuum pump 98, refrigerant pump, water pump, microwave generators 76 and the motors 48, 50 to rotate the roller are actuated, all under the control of the PLC. The vacuum chamber 22 is brought to reduced pressure. Operating pressures may be in the range, for example, of about 30 to 300 Torr (3.9 to 39.9 kPa), or 0.1 to 30 Torr (0.13 to 4.0 kPa). A container 24 of organic material to be dehydrated is loaded into the loading module 30, whose pressure is then equalized with the vacuum chamber 22. The airlock door 34 lifted, and the container 24 is pushed by the piston 68 through the opening 90 of the end support frame 86 at the input end 26 into the vacuum chamber 22, supported by and moving along the rotating roller 42. The container 24 rotates about its longitudinal axis within the vacuum chamber 22 by engagement of the spur gear teeth 60 on its outer circumferential surface with the spur gear teeth 46 on the outer circumferential surface of the rotating roller 42, tumbling the material in the container 24 as the material is being dehydrated. Longitudinally-extending guide members 72, 74 hold the container 24 in position on the roller 42 as it moves along the length thereof. The spur gear teeth 46, 60 mesh during the movement of the container 24 along the roller 42.

In the illustrated example embodiment, the container 24 is loaded into the loading module 30 through airlock door 33. The loading module 30 is sealed and its pressure equalized with the vacuum chamber 22. Airlock door 34 is then opened, and actuation of the pushing cylinder 64 moves the piston 68 into the loading module 30, pushing the container 24 from the loading module 30 into the vacuum chamber 22. The airlock door 34 is then closed and the piston 68 is retracted. The second container is loaded in the same manner as the first container. Once the second container is in the loading module 30, the airlock door 34 is opened, and the piston 68 pushes it onto the rotating roller 42. This pushes the second container against the first container, displacing the first container farther down the vacuum chamber 22 towards the discharge end 28 by the length of one container. The process is repeated by loading additional containers in the same manner, each container displacing the previously-loaded ones in the vacuum chamber 22. Once the first container is at or near the discharge end 28, the airlock door 36 is opened, and the pulling cylinder 66 is actuated to move the piston 70 into the vacuum chamber 22 through the discharge end 28, and pull the first container into the discharge module 32. The airlock door 36 is then closed, and the piston 70 is retracted. The discharge module 32 is brought to atmospheric pressure and the first container is removed through airlock door 37. The discharge module 32 is then sealed and its pressure equalized with the vacuum chamber 22. The process is again repeated by removing additional containers from the vacuum chamber 22 in the same manner. The apparatus is operated on a continuous-throughput basis.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

What is claimed is:

1. An apparatus for dehydrating organic material, comprising:
   (a) container for holding the organic material, the container being rotatable about a longitudinal axis thereof, the container having spur gear teeth extending along an outer circumferential surface thereof;
   (b) a vacuum chamber having an input end for introduction of the container and a discharge end for removal of the container;
   (c) a roller extending within the vacuum chamber between an input zone proximate to the input end and a discharge zone proximate to the discharge end, the roller having spur gear teeth extending along an outer circumferential surface thereof, the roller being positioned within the vacuum chamber to support the container, with the spur gear teeth of the roller meshing with the spur gear teeth of the container;
   (d) means for rotating the roller about a longitudinal axis thereof and thereby rotating the container;
   (e) means for holding the rotating container on the roller;
   (f) means for moving the rotating container through the vacuum chamber along the roller from the input end to the discharge end;
   (g) a microwave generator arranged for transmission of microwave radiation into the vacuum chamber; and
   (h) means for reducing pressure inside the vacuum chamber.

2. An apparatus according to claim 1, wherein the spur gear teeth on the container are parallel to the longitudinal axis of the container and the spur gear teeth on the roller are parallel to the longitudinal axis of the roller.

3. An apparatus according to claim 1, wherein the longitudinal axis of the roller is horizontal.

4. An apparatus according to claim 1, wherein the means for holding the rotating container on the roller comprises a pair of guide members.

5. An apparatus according to claim 1, wherein the means for holding the rotating container on the roller comprises multiple pairs of longitudinally- spaced or adjoining guide members.

6. An apparatus according to claim 1, wherein the means for moving the rotating container through the vacuum chamber along the roller comprises a piston arranged to push the container into the vacuum chamber.

7. An apparatus according to claim 1, further comprising means for introducing the container into the input end of the vacuum chamber.

8. An apparatus according to claim 7, wherein the means for introducing the container into the input end of the vacuum chamber comprises:
   a loading module having a first end for receiving the container and a second end adjacent to the input end of the vacuum chamber;
   a loading, airlock door separating the loading module from the input end of the vacuum chamber; and
   a piston arranged to push the container from the loading module into the vacuum chamber.

9. An apparatus according to claim 8, wherein the container has a closed end and a removable lid at the opposite end.

10. An apparatus according to claim 1, further comprising means for removing the container from the vacuum chamber at the discharge end.

11. An apparatus according to claim 10, wherein the means for removing the container from the vacuum chamber at the discharge end thereof comprises:
   a discharge module having a first end adjacent to the discharge end of the vacuum chamber and a second end;
   an unloading, airlock door separating the discharge module from the discharge end of the vacuum chamber; and
   a piston arranged to pull the container from the vacuum chamber into the discharge module.

12. An apparatus according to claim 1, wherein spur gear teeth of the roller extend along the entire length of the outer circumferential surface thereof.

13. An apparatus according to claim 1, wherein the spur gear teeth of the roller extend intermittently along the length of the outer circumferential surface thereof, the roller having alternating sections of circumferential surfaces with spur gear teeth and sections with smooth circumferential surfaces.

14. A method for dehydrating an organic material, comprising the steps of:
   (a) reducing pressure within a vacuum chamber to a pressure less than atmospheric;
   (b) introducing a container of the organic material into the vacuum chamber;
   (c) supporting the container on a single roller within the vacuum chamber, with spur gear teeth on the roller meshing with spur gear teeth on the container;
   (d) rotating the roller, causing the spur gear teeth on the roller to engage with the spur gear teeth on the container and thereby rotate the container;
   (e) moving the rotating container through the vacuum chamber supported on the roller, while applying microwave radiation to dehydrate the organic material; and
   (f) removing the container of dehydrated organic material from the vacuum chamber.

15. A method according to claim 14, wherein the container inside the vacuum chamber is rotated about a horizontal axis.

\* \* \* \* \*